United States Patent

Leon et al.

[11] Patent Number: 5,761,987
[45] Date of Patent: Jun. 9, 1998

[54] BURNER HEATABLE INSULATED UTILITY POT

[76] Inventors: Nathaniel J. Leon, P.O. Box 36007, Towson, Md. 21286; Jeffrey A. Hayes, 1391 Peachwood Dr., Encinitas, Calif. 92024

[21] Appl. No.: 764,606

[22] Filed: Dec. 11, 1996

[51] Int. Cl.$^6$ .................................... A47J 31/38
[52] U.S. Cl. ................ 99/297; 220/756; 220/410; 220/413; 126/373
[58] Field of Search ................. 99/297, 285, 286, 99/287, 403; 220/756, 762, 410, 412, 413; 126/373, 375

[56] References Cited

U.S. PATENT DOCUMENTS

| | | | |
|---|---|---|---|
| 1,037,985 | 9/1912 | Rengstorf | 220/756 X |
| 4,163,374 | 8/1979 | Moore et al. | 220/412 X |
| 5,570,623 | 11/1996 | Lin | 99/297 X |
| 5,596,921 | 1/1997 | Kuwana et al. | 220/412 X |
| 5,597,086 | 1/1997 | King-Shui | 220/412 X |

*Primary Examiner*—Reginald L. Alexander
*Attorney, Agent, or Firm*—Henri J. A. Charmasson; John D. Buchaca

[57] ABSTRACT

A versatile cooking, and food and beverage handling utensil comprises a vessel made of heat-resistant material provided with an articulated handle that can assume a near horizontal cooking position or a near vertical drinking position. A heat insulating sleeve can be conveniently engaged over the vessel and locked into place by an extension of the articulated handle. A lid assembly has a sealable aperture and a pouring spout or drinking brim. A sieve press can turn the vessel into a coffee or tea brewing pot that doubles as a mug once the sleeve is installed.

11 Claims, 1 Drawing Sheet

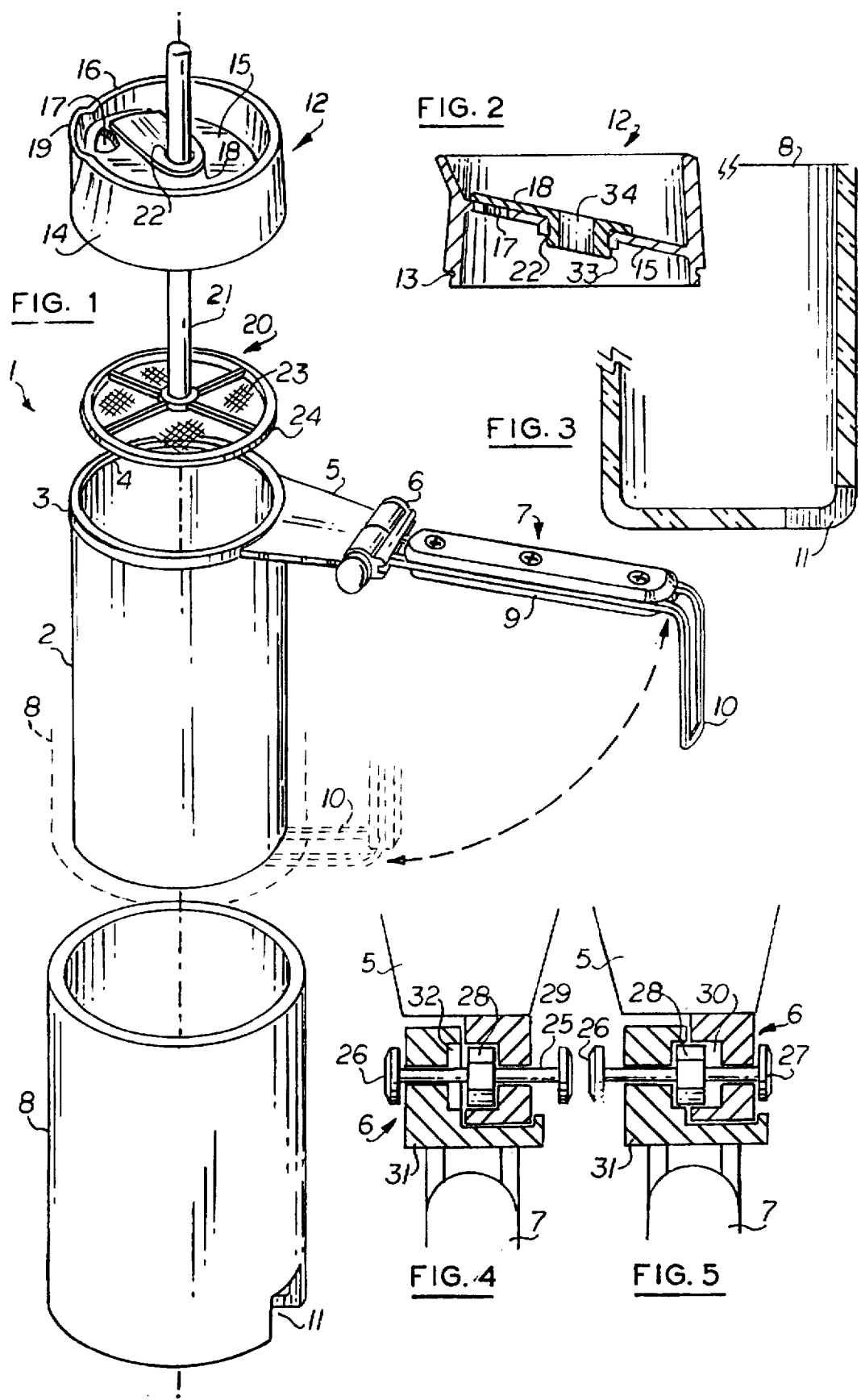

BURNER HEATABLE INSULATED UTILITY POT

FIELD OF THE INVENTION

This invention relates to kitchen utensils, and more particularly to cooking pots and drinking vessels particularly adapted to camping and other outdoors activities.

BACKGROUND OF THE INVENTION

Most cooking utensils of the prior art including coffee pots designed to be used on open flame or stove tops cannot be conveniently handled when hot. They cannot be laid down directly on conventional wood, plastic, or fabric table tops. Their contents must be poured or transferred into another vessel before they can be consumed. Moreover, their material, having a good heat transfer coefficient to expedite cooking, tends also to dissipate that heat rapidly once the vessel is taken off the source of heat.

It would be advantageous to have cooking and heating utensils for use in camping and other outdoors activities which can have multiple functions in order to reduce the number, bulk and weight of the equipment. Present devices that can provide good insulation against the loss of absorption of heat such as thermal-insulated bottles cannot be used to cook food or brew coffee. Cooking pans and pots cannot be conveniently used to heat or drink directly from them.

The instant invention results from an attempt to devise a versatile cooking and food handling implement to replace a variety of traditional, distinct and separate devices.

SUMMARY OF THE INVENTION

The principal and secondary objects of this invention are to provide a vessel that can be used singly to cook food, to brew coffee, tea and other hot beverages, to heat food and to drink beverages thereof, prevent loss of absorption of heat, and be handled directly or rested on a heat-sensitive surface as soon as it has been taken off a cooking fire or cooking appliance.

These and other important objects are achieved by a simple cooking, and food and beverage handling utensil consisting of a vessel made of heat-resistant but heat transferring material and provided with an articulated handle that can assume either a cooking position or a drinking position. A heat-insulated sleeve can be conveniently engaged over the vessel and locked into place by an extension of the articulated handle. A lid assembly has a sealable structure with a pouring spout and drinking brim. A sieve press can turn the vessel into a coffee or tea brewing pot that doubles as a drinking mug once the insulating sleeve is installed.

BRIEF DESCRIPTION OF THE DRAWING

FIG. 1 is a perspective, exploded view of a burner heatable, insulated utility pot according to the invention;

FIG. 2 is a cross-sectional view of the lid assembly;

FIG. 3 is a partial cross-sectional view of the insulating sleeve;

FIG. 4 is a diagrammatical illustration of the handle articulation mechanism shown in a first unlocked position; and FIG. 5 is a diagrammatical illustration of said mechanism shown in a second locked position;

DESCRIPTION OF THE PREFERRED EMBODIMENT OF THE INVENTION

Referring now to the drawing, there is shown in FIG. 1 a perspective view exploded along axis X of a burner heatable, insulated utility pot 1 according to the invention. The pot comprises a cooking vessel 2 made of a flame-proof, and heat resistant material with good heat-transfer properties such as stainless steel. A collar 3 is forced-fitted around the upper rim 4 of the vessel. Projecting laterally and horizontally from the collar is a tang 5 mounting a hinge 6 at its distal end. Attached to the opposite side of the hinge is a handle 7 which can be rotatively oriented at a plurality of fixed positions in relation to the axis X of the vessel. A sleeve 8 made of heat-insulating material such as ceramic or other similar substance with a low heat transfer coefficient has an inner diameter commensurate with outer diameter of the vessel 2, and approximately the same height as the vessel. The sleeve 8 can thus be slipped over the vessel wall as partially shown in dotted line. The handle 7 comprises a grasping section 9 and an orthogonal projection 10 at its distal end. When the handle is rotated to a position substantially parallel to axis X, the orthogonal projection 10 extends partially under the bottom of the vessel through a notch 11 cut in the bottom part of the sleeve 8 as partially illustrated in dotted line. The sleeve is thus fixedly held around the vessel by the orthogonal projection 10.

Accordingly, the vessel can be used with the handle extended in the horizontal position perpendicular to axis X to cook food or brew coffee or other beverages over an open flame or a range top. The sleeve can be installed around the vessel and locked into place by placing the handle in a vertical position substantially parallel to axis X. The utensil can then be put down on a wood, plastic or fabric surface without risk of any damage to that surface. A lid assembly 12 more specifically illustrated in FIG. 2 can be mounted on top of the vessel by the snapping action of its flanged lower rim 13 with the inside wall of the collar 3. The lid assembly comprises a peripheral wall 14, and a cover 15. The wall 14 extends upwardly beyond the top surface of the cover in order to form a convenient drinking lip or brim 16. An aperture 17 in the cover can be releasably sealed by a shutter 18 rotating around its attachment in the center of the cover. The brim 16 is slightly bent into a spout 19 to facilitate pouring liquids out of the pot. The top cover 15 is slanted away and downwardly from the aperture in order to provide clearance for the nose of the user while drinking from the pot. A sieve press 20 comprises a central shaft 21 passing through a hole 22 in the center of the top cover, and a circular sieve 23 mounted concentrically at the bottom end of the shaft. The sieve has an outer periphery 24 commensurate with the inside diameter of the vessel 2.

As more specifically illustrated in FIGS. 4 and 5, the hinge 6 comprises a locking mechanism which allows its immobilization in a plurality of angular positions. The shaft 25 of the hinge is constituted by the stems of a pair of pushbuttons 26, 27 connected end-to-end in the center of an octagonal tenon 28. The first half of the hinge 29 which is permanently connected to the tang 5 has a central cavity 30 whose shape and dimension are designed to tightly confine the octagonal tenon 28. The second half 31 of the hinge has a similar cavity 32 whose depth is about only half of the first cavity. When the first pushbutton 26 associated with the second half of the hinge 31 is pressed, the tenon 28 is completely contained in the cavity 30 of the first half of the hinge 29 as illustrated in FIG. 4. The second half of the hinge 31 and the handle 7 are allowed to rotate freely. When the pushbutton 27 associated with the first half of the hinge 29 is pressed, the tenon 28 shifts into the shallow mortisse-like cavity 32 of the second half of the hinge with about half of its width remaining into the cavity 30 associated with the first part of the hinge as illustrated in FIG. 5. In that position, the hinge is immobilized and the handle locked into a fixed position.

The rotating shutter 18 is held in place by the flanged lower and outer edge 33 at the base of its central channel 34 which snaps under the lower edge of the hole 22 in the center of the top cover 15.

It can now be seen that, whether sized like a cooking pot or like a drinking mug, the utility pot 1 may be used to cook food or brew a beverage in direct contact with a heat source with the handle extended for convenient and safe handling. With the sleeve installed and the handle folded back, the same device can be safely used as an insulated food or drink container and dispenser, or as a drinking cup.

While the preferred embodiment of the invention has been described, modifications can be made and other embodiments may be devised without departing from the spirit of the invention and the scope of the appended claims.

What is claimed is:

1. A cooking utensil which comprises:

a vessel made of heat-resistant material and having an upper rim and a vertical central axis;

a heat-insulating sleeve shaped and dimensioned to engage over a substantial portion of said vessel;

a handle projecting from said vessel; and means on said handle for releasably locking said sleeve around said vessel.

2. A cooking utensil which comprises:

a vessel made of heat-resistant material and having an upper rim and a vertical central axis;

a heat-insulating sleeve shaped and dimensioned to engage over a substantial portion of said vessel;

a handle projecting from said vessel; and means for releasably holding said sleeve around said vessel;

wherein said means for holding said sleeve comprises said handle having a movable member interlockable with said sleeve.

3. A cooking utensil which comprises:

a vessel made of heat-resistant material and having an upper rim and a vertical central axis;

a heat-insulating sleeve shaped and dimensioned to engage over a substantial portion of said vessel;

a handle protecting from said vessel; and means for releasably holding said sleeve around said vessel;

wherein said handle comprises:

a first member projecting from said vessel;

a grasping section hingedly connected to said first member and fixedly securable in at least two orientations in relation to said vessel; and second member projecting from said grasping section and extending into an interlocking position with said sleeve when placed in one of said orientations.

4. The utensil of claim 3 wherein said vessel further comprises a collar secured around said rim and to said first member.

5. The utensil of claim 4 which further comprises a lid assembly releasably mounted on said collar.

6. The utensil of claim 5 wherein said lid assembly comprises a top cover having a pouring aperture; and means for releasably closing said aperture.

7. The utensil of claim 6 which further comprises a sieve press.

8. The utensil of claim 7 wherein said vessel has a cylindrical inner wall of a given diameter; and said sieve press comprises a circular sieve having an outer diameter commensurate with said given diameter, and a stem projecting upwardly from said sieve through a central hole in said top cover.

9. The utensil of claim 6 wherein said handle comprises a hinge between said first member and said grasping section; and means for locking said grasping section in a first orientation substantially perpendicular to the central axis of said vessel, and in a second orientation substantially parallel to said axis;

wherein in said first orientation said second member is held away from said sleeve, and in said second orientation said second member is positioned in holding contact with said sleeve.

10. The utensil of claim 6 wherein said lid assembly comprises a pouring spout.

11. The utensil of claim 6 wherein said lid assembly comprises a drinking brim.

* * * * *